(12) United States Patent
Tajika et al.

(10) Patent No.: US 7,181,709 B2
(45) Date of Patent: Feb. 20, 2007

(54) CLOCK DELAY ADJUSTING METHOD OF SEMICONDUCTOR INTEGRATED CIRCUIT DEVICE AND SEMICONDUCTOR INTEGRATED CIRCUIT DEVICE FORMED BY THE METHOD

(75) Inventors: Kenichi Tajika, Kyoto (JP); Hiroki Tomoshige, Kanagawa (JP); Minoru Itoh, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 384 days.

(21) Appl. No.: 10/766,954

(22) Filed: Jan. 30, 2004

(65) Prior Publication Data
US 2004/0250152 A1 Dec. 9, 2004

(30) Foreign Application Priority Data
Jan. 31, 2003 (JP) ............................ P2003-024093
Sep. 5, 2003 (JP) ............................ P2003-313917

(51) Int. Cl.
*G06F 17/50* (2006.01)
(52) U.S. Cl. .................................. 716/6; 716/4; 716/5
(58) Field of Classification Search ................ 716/4–6
See application file for complete search history.

(56) References Cited

U.S. PATENT DOCUMENTS 5,307,381 A * 4/1994 Ahuja ......................... 375/356
5,410,491 A * 4/1995 Minami ........................... 716/6
5,557,779 A * 9/1996 Minami ........................... 716/6
5,686,845 A * 11/1997 Erdal et al. .................... 326/93
5,889,682 A 3/1999 Omura et al.
5,978,930 A * 11/1999 Furuta et al. ................ 713/601
6,020,774 A * 2/2000 Chiu et al. ................... 327/295
6,053,950 A * 4/2000 Shinagawa ..................... 716/2
6,173,435 B1 * 1/2001 Dupenloup ................... 716/18
6,651,232 B1 * 11/2003 Pileggi et al. .................. 716/7
6,737,903 B2 * 5/2004 Suzuki ......................... 327/293

FOREIGN PATENT DOCUMENTS

| JP | 5-198674 | | 8/1993 |
| JP | 5-243380 | | 9/1993 |
| JP | 6-140605 | | 5/1994 |
| JP | 2002-76119 | A | 3/2002 |
| JP | 2002-245109 | A | 8/2002 |

* cited by examiner

*Primary Examiner*—Thuan Do
*Assistant Examiner*—Naum Levin
(74) *Attorney, Agent, or Firm*—McDermott Will & Emery LLP

(57) ABSTRACT

In a clock delay adjusting method of a semiconductor integrated circuit device, a plurality of source points for adjusting a clock delay is provided to synchronize a value of the clock delay from each of the source points of each of hierarchical blocks in a semiconductor chip to a clock input circuit operating synchronously with a clock, according to circuit design conditions of the hierarchical blocks. Area terminals are provided in the source points, respectively. A clock input terminal of the semiconductor chip and each area terminal are connected through a clock line so as to be clock distributed over a hierarchical top. A clock delay between the hierarchical blocks is adjusted.

15 Claims, 8 Drawing Sheets

CLOCK DELAY ADJUSTING METHOD OF SEMICONDUCTOR INTEGRATED CIRCUIT DEVICE AND SEMICONDUCTOR INTEGRATED CIRCUIT DEVICE FORMED BY THE METHOD

BACKGROUND OF THE INVENTION

1. Field of the Invention

The present invention relates to a method of designing a semiconductor integrated circuit device and the semiconductor integrated circuit device, and more particularly to a method of carrying out adjustment to adapt the clock delay values of a clock input terminal and a clock input circuit to be operated in response to a clock signal such as a flip-flop circuit in each hierarchical block.

2. Description of the Related Art

In a method of synchronously adjusting a clock delay among hierarchical blocks 902, 903, 904 and 905 in the layout design of a semiconductor integrated circuit device, conventionally, a clock input terminal 907 is formed on the outer periphery of each of the hierarchical blocks 902 to 905 as shown in FIG. 10. There is employed a method of clock-distributing and connecting the wiring of a clock line by a so-called equal-length wiring for wiring on a hierarchical top in such a manner that the length of a wiring 901 (a wiring length) is equal in order to synchronize the arrival time of a clock signal between the clock input terminal 907 and a clock input terminal 900 of a semiconductor chip to be the supply source of a clock signal. Thus, a clock delay to each hierarchical block is adjusted to be synchronized (for example, see JP-A-5-198674 gazette (Pages 1 to 4, FIG. 1)). 906 denotes the boundary of a semiconductor chip.

Moreover, there has been a technique for wiring and connecting a mutual signal between hierarchical blocks in which a signal terminal is formed on the hierarchical block and mutual signals between the blocks are wired and connected (for example, see JP-A-5-243380 gazette (Paragraph 1, FIG. 2)).

However, a clock delay adjusting method of synchronously adjusting a clock delay between hierarchical blocks in the layout design of the conventional semiconductor integrated circuit device synchronizes a clock delay up to the clock terminal of a clock input circuit which is a circuit to be operated synchronously with the clocks of all flip-flops in the hierarchical block on and after one point of the clock input terminal formed on the outer periphery of the hierarchical block, and furthermore, is executed on the condition that a clock delay for each hierarchical block is synchronized.

In the case in which a hierarchical block having a large circuit scale and a large block size is provided on a semiconductor chip, however, there are a large number of arrangement conditions that the position of arrangement of the clock input circuit in the hierarchical block is gathered closely or distributed depending on the circuit conditions of the hierarchical block. Therefore, it is hard to synchronize the clock delay only on and after one point of the clock input terminal formed on the outer periphery of the hierarchical block. In the actual development of the semiconductor integrated circuit device, furthermore, such a case is really caused very often. Similarly, it is very hard to synchronize the clock delay of each hierarchical block.

In the conventional method, therefore, there has been a problem in that the clock delay of a semiconductor integrated circuit device cannot be adjusted to be synchronized because of the presence of a block having a clock delay in a hierarchical block which is not synchronized even if the clock input terminal of each hierarchical block and the clock input terminal of a semiconductor chip are clock distributed by an equal-length wiring over a hierarchical top to execute the wiring connection of a clock line to synchronize the arrival time of a clock signal.

SUMMARY OF THE INVENTION

The invention has been made in consideration of the actual circumstances and has an object to provide a method of providing an area terminal for a clock input in each hierarchical block and carrying out timing control including the synchronization of a clock delay in each hierarchical block and timing control in consideration of the synchronization of a clock delay over a hierarchical top, thereby adjusting the clock delay in the adjustment of the clock delay in the layout design of a semiconductor integrated circuit device having a plurality of hierarchical blocks.

Moreover, it is another object of the invention to provide a semiconductor integrated circuit device constituted to carry out timing control including the synchronization of a clock delay in each hierarchical block and timing control including the synchronization of a clock delay over a hierarchical top, thereby adjusting the clock delay.

A method according to the invention is characterized in that the desired value of the clock delay of a semiconductor chip is set, a plurality of source points for adjusting the clock delay can be provided in at least one of hierarchical blocks in the boundary of the semiconductor chip depending on the desired value and a clock signal can be supplied from the source points to each of the hierarchical blocks, and delay adjustment in the hierarchical block over a hierarchical top is considered.

In this case, the condition of determining the source points is decided to achieve the desired value of the clock delay in consideration of the design conditions of a circuit such as the position of arrangement of a clock input circuit in each hierarchical block.

More specifically, the invention provides a method, wherein a plurality of source points for adjusting a clock delay is provided to synchronize a value of the clock delay from each of the source points of each of hierarchical blocks in a semiconductor chip to a clock input circuit to be operated synchronously with a clock depending on a circuit design condition of the hierarchical block, and an area terminal is provided in the source point, and a clock input terminal of the semiconductor chip and each area terminal are connected through a clock line so as to be clock distributed over a hierarchical top and a clock delay between the hierarchical blocks is adjusted.

According to the structure, there is provided a plurality of source points for adjusting the clock delay to synchronize the value of the clock delay from each of the source points in each hierarchical block to the clock input circuit to be operated synchronously with the clock, and the area terminal is provided on the source point to supply the clock from the area terminal to each clock input circuit. Therefore, it is possible to easily achieve the adjustment of the clock delay up to each clock input circuit by adjusting the clock delay from the clock input terminal to the area terminal over the hierarchical top.

In the method according to the invention, moreover, at least one of the hierarchical blocks has a plurality of area terminals in such a manner that a wiring length between the clock input terminal of the semiconductor chip and the area terminal is equal.

By the structure, the portion between the clock input terminal and the area terminal is set to be the equal-length wiring. Consequently, it is possible to easily achieve the adjustment of the clock delay up to each clock input circuit.

In the method according to the invention, furthermore, a special area terminal for a clock input is provided on the source point for adjusting the clock delay. The area terminal is private for a clock and the position thereof is freely determined over the hierarchical block, and a plurality of area terminals can be provided.

The clock delay is adjusted for the target of the clock delay of a semiconductor chip every area terminal for each clock input of each hierarchical block and desirably for exclusive use.

In the method according to the invention, moreover, the clock input terminal of the semiconductor chip and the area terminal are connected through a clock distribution to obtain such a wiring length as to compensate for a variation in the clock delay value of the source point in the hierarchical block.

More specifically, when the adjustment is ended, the upper layer of the wiring layer is used over the hierarchical top to carry out a wiring connection in such a manner that a portion between the clock input terminal of the semiconductor chip and the area terminal for each clock input becomes a clock line which has an equal length or is clock distributed in consideration of a variation in the clock delay of each area terminal. The upper layer implies a layer provided on a layer where the wiring layer is to be formed.

According to the structure, the source points for adjusting the clock delay are provided to be the area terminals for a clock input on the hierarchical block in the boundary of the semiconductor chip depending on the design conditions of the circuit, respectively. Desirably, the source point is set to be the special area terminal and the portion between the clock input terminal of the semiconductor chip and each special area terminal for a clock input is wired and connected to be clock distributed over the hierarchical top in consideration of the arrival time of the clock, and the condition of easily carrying out the synchronization of the clock delay in the hierarchical block and that of the clock delay between the hierarchical blocks is made. Thus, it is possible to implement the adjustment of the clock delay between the hierarchical blocks.

In the method according to the invention, moreover, when a clock delay between the hierarchical blocks of one chip through an equal-length wiring is adjusted from the clock input terminal of the semiconductor chip to the special area terminal for a clock input of the hierarchical block and a place in which the clock delay value does not satisfy a synchronous desired value is then generated over the clock line from the special area terminal for a clock input in a certain hierarchical block to the clock input circuit, a delay adjusting buffer circuit is inserted in a place on the clock line to be an object again, thereby adjusting the clock delay and synchronizing the clock delay between the hierarchical blocks of one chip.

By the method, it is possible to adjust a delay with a high workability.

In the method according to the invention, furthermore, an area terminal for a clock input is provided in at least one place over at least one hierarchical block in a semiconductor chip in a clock wiring design of the semiconductor chip, a clock input terminal of the semiconductor chip and the area terminal for a clock input are wired over a hierarchical top, a difference in a delay value between the area terminal and the clock input terminal is calculated, and a clock delay is adjusted from the area terminal to a plurality of clock input circuits in order to compensate for the difference in the delay value in the hierarchical block.

By the method, it is possible to adjust a delay with a high workability.

In the method according to the invention, moreover, the clock input terminal of the semiconductor chip and the area terminal for a clock input are wired over the hierarchical top in such a manner that a total clock wiring length is almost the smallest.

By the method, it is possible to reduce the delay and to realize an increase in a speed.

In the method according to the invention, furthermore, the clock input terminal of the semiconductor chip and the area terminal for a clock input are wired over the hierarchical top in such a manner that a maximum clock wiring length is almost the smallest.

By the method, it is possible to reduce the clock delay of the whole chip and to realize an increase in a speed.

In addition, the clock input terminal of the semiconductor chip and each area terminal for a clock input over the hierarchical top are wired in such a manner that a total clock wiring length is almost the smallest or a maximum clock wiring length is almost the smallest, and a difference in a delay value between each area terminal and the clock input terminal is calculated, and the clock delay is adjusted from each area terminal to the clock input circuits such as a plurality of flip-flops in order to compensate for a difference in the delay value in each hierarchical block. In each hierarchical block, a close area terminal to the clock input terminal is clock distributed to a large number of clock input circuits and a distant area terminal from the clock input terminal is clock distributed to a small number of clock input circuits. Thus, the clock delay is adjusted.

According to the structure, the clock delay value from the clock input terminal to each clock input circuit can be minimized as a whole chip, and the waste of a clock wiring length for adjusting a clock timing can be reduced as much as possible.

In the method according to the invention, moreover, a number of the clock input circuits for a clock distribution in the hierarchical block is increased from the clock input terminal of the hierarchical top to an area terminal having a small clock delay value, and the number of the clock input circuits for a clock distribution in the hierarchical block is reduced from the clock input terminal to an area terminal having a great clock delay value, thereby adjusting a clock delay.

By the method, it is possible to equalize the sum of the clock delay value obtained by the clock wiring over the hierarchical top and the clock delay value obtained by the clock distribution in the hierarchical block.

In the method according to the invention, furthermore, the clock line is formed by using a special wiring layer.

Consequently, the wiring can have a degree of freedom so that the design can easily be carried out.

In the method according to the invention, moreover, the clock input terminal is constituted by a plurality of clock input terminals, and forms a multisystem clock having such a structure that a clock input is carried out from the clock input terminals to one hierarchical block.

In the case in which the multisystem clock is to be used, the delay adjustment may be carried out for each clock system by utilizing a plurality of area terminals. In addition, the area terminals may be mutually utilized by different clock systems.

In the method according to the invention, moreover, a repeater buffer circuit is further inserted in or between the hierarchical blocks on a wiring of the clock line over the hierarchical top, thereby suppressing waveform rounding of a clock signal.

Consequently, the waveform rounding can be suppressed so that a semiconductor integrated circuit having a higher reliability can be provided.

In the method according to the invention, moreover, a plurality of clock input circuits is provided in the hierarchical block, and the value of the clock delay of the clock line between a clock control circuit in the hierarchical block and each of the clock input circuits is adjusted by using a delay adjusting buffer circuit when the clock control circuit is to be inserted into the clock line to each of the clock input circuits.

Consequently, it is possible to produce an advantage that the clock delay value can freely be adjusted in the hierarchical block.

In the method according to the invention, furthermore, a position of arrangement of the area terminal is adjusted in such a manner that a wiring path for the clock line obtained before a floor plan correction can also be reused after the floor plan correction.

Consequently, it is possible to produce an advantage that the design can be carried out more easily.

In addition, a semiconductor integrated circuit device according to the invention is formed by carrying out the delay adjustment using the adjusting method.

The semiconductor integrated circuit device is characterized in that at least one of the hierarchical blocks includes a plurality of special area terminals for a clock and a clock line is constituted by a special wiring layer for the clock line which is provided as an upper layer on the area terminal.

According to the structure, it is possible to provide the semiconductor integrated circuit device in which the delay adjustment is carried out between the hierarchical blocks and in the hierarchical blocks.

In the invention, on a chip layout basis, the hierarchical top provided with the clock input terminal is set to be a first hierarchical layer and a hierarchical block to be a second hierarchical layer is connected thereunder, and the area terminal to be the source point is provided every hierarchical block.

As described above, according to the invention, a plurality of source points for adjusting a clock delay is provided to synchronize a value of the clock delay from each of the source points of each of hierarchical blocks in a semiconductor chip to a clock input circuit to be operated synchronously with a clock depending on a circuit design condition of the hierarchical block, and an area terminal is provided in the source point, and a clock input terminal of the semiconductor chip and each area terminal are connected through a clock line so as to be clock distributed over a hierarchical top and a clock delay between the hierarchical blocks is adjusted. Therefore, it is possible to easily synchronize the clock delay from the area terminal in the hierarchical block to the clock input circuit.

Desirably, the wiring of the clock line between the clock input terminal of the semiconductor chip and each special area terminal for a clock input is clock distributed and connected by an equal-length wiring over the hierarchical top so that the clock delay can be adjusted between the hierarchical blocks of a semiconductor integrated circuit device.

Moreover, the clock input terminal and the area terminal for a clock input are wired over the hierarchical top in such a manner that a total clock wiring length or a maximum clock wiring length is almost the smallest, and a clock wiring is carried out to compensate for a delay difference in the hierarchical block. Consequently, a clock delay value can be minimized as a whole chip and the clock wiring length can be optimized.

If the upper layer of a wiring layer is used for a connection in the clock distribution, furthermore, it is possible to efficiently implement a circuit design without the limitation of a circuit layout.

According to the invention, moreover, even if a slight variation in the clock delay on each point of the special area terminal for a clock input is caused, it is possible to adjust the clock delay of the semiconductor integrated circuit device by practically utilizing the upper layer of the wiring layer over the hierarchical top to distribute the wiring of the clock line with such a wiring length as to take a variation in the clock delay into consideration.

Accordingly, it is possible to adjust the clock delay between the hierarchical blocks of the multisystem clock of the semiconductor integrated circuit device.

According to the invention, the repeater buffer circuit of the clock line is inserted in or between the hierarchical blocks provided across the wiring of the clock line over the hierarchical top thereover. Consequently, it is possible to take a countermeasure against waveform rounding, thereby adjusting the clock delay of the semiconductor integrated circuit device.

According to the invention, also in the case in which a clock control circuit is inserted over the clock line to a flip-flop circuit in the hierarchical block, it is possible to adjust the clock delay of the semiconductor integrated circuit device by providing the special area terminal for a clock input before the input of the clock control circuit through the clock line over the hierarchical block, and furthermore, adjusting the clock delay between a gate circuit for clock control in the hierarchical block and each flip-flop circuit with the use of the delay adjusting buffer circuit of the clock line, and adjusting the clock delay with the use of the repeater buffer circuit over the hierarchical top.

According to the invention, even if a floor plan correction is generated on a certain hierarchical block in the semiconductor integrated circuit-device, it is possible to exactly utilize a wiring path for the uncorrected clock line by determining a source point for adjusting the clock delay in the hierarchical block to carry out the floor plan correction in a position in which the special area terminal for a clock input can be connected to the wiring path for the clock line which has not been subjected to the floor plan correction.

According to the invention, even if there is a hierarchical block in which the clock delay cannot be synchronized after the adjustment of the clock delay between the hierarchical blocks of one chip, it is possible to adjust the clock delay of the semiconductor integrated circuit device by inserting a delay adjusting buffer circuit into the hierarchical block to be an object again through a clock tree synthesis (CTS) method and carrying out the clock delay, thereby synchronizing the clock delay between the hierarchical blocks of one chip.

According to the invention, it is possible to implement a semiconductor integrated circuit device utilizing the advantages of the invention.

DESCRIPTION OF THE PREFERRED EMBODIMENTS

An embodiment of the invention will be described below in detail with reference to the drawings.

First Embodiment

In the embodiment, a circuit design is carried out in the following procedure by a method of adjusting a clock delay over a hierarchical top on the condition that a clock delay between hierarchical blocks in a semiconductor integrated circuit device is synchronized.

1. A fine source point for adjusting a clock delay is provided on the hierarchical block in the boundary of a semiconductor chip according to the condition of the circuit design.

2. The source point is set to be a special area terminal for a clock input.

3. The wiring of a clock line between the clock input terminal of the semiconductor chip and each special area terminal for a clock input is clock distributed and connected by an equal-length wiring with the use of the upper layer of a wiring layer over the hierarchical top.

According to the method, the synchronization of the clock delay between the hierarchical blocks is implemented, and furthermore, the wiring of the clock line through the equal-length wiring is distributed over the hierarchical top, thereby adjusting the clock delay.

Figure 1:
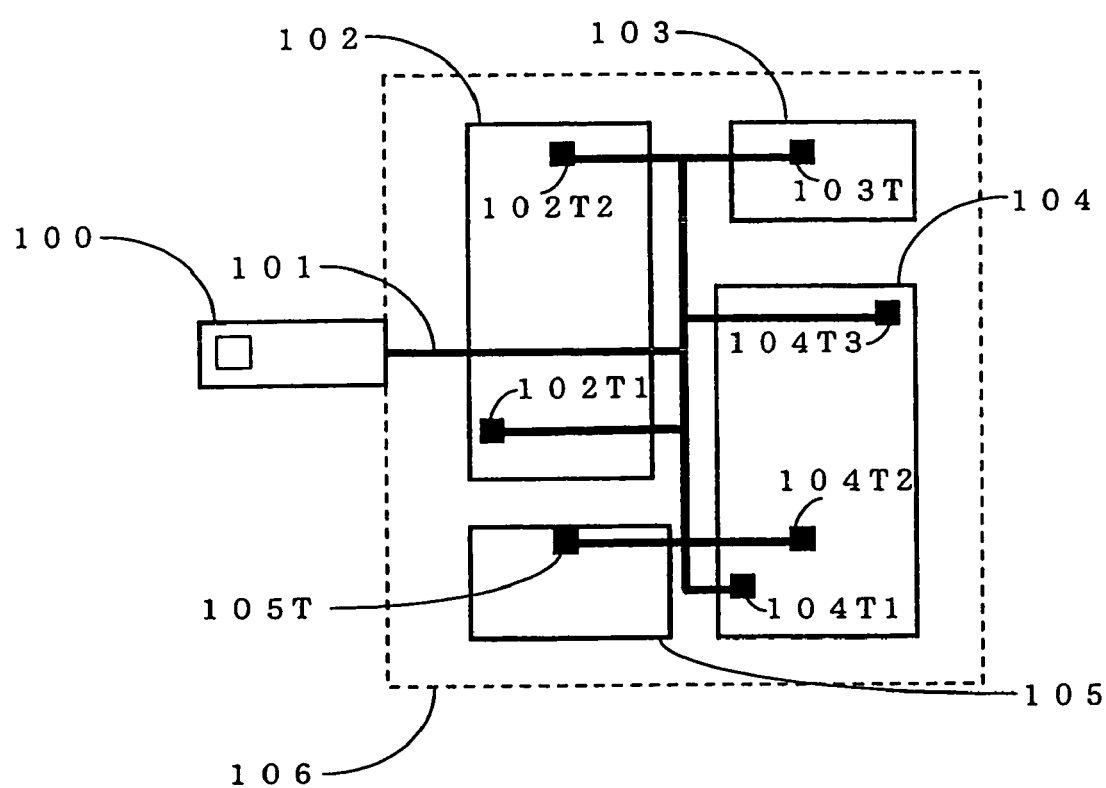
FIG. 1 is a diagram showing a method of adjusting a clock delay over a hierarchical top by a clock distribution wiring to be an equal-length wiring according to a first embodiment of the invention.

FIG. 1 shows a method of adjusting a clock delay between hierarchical blocks through a clock distribution wiring to be an equal-length wiring according to a first embodiment of the invention. In FIG. 1, a plurality of special area terminals for a clock input which serves as source points for adjusting a clock delay is provided on a hierarchical block A102, a hierarchical block B103, a hierarchical block C104 and a hierarchical block D105 in a boundary 106 of a semiconductor chip according to the conditions of a circuit design. Each of the hierarchical blocks 102, 103, 104 and 105 includes one to three area terminals. The hierarchical block 102 includes two area terminals 102T1 and 102T2, the hierarchical block 104 includes three area terminals 104T1, 104T2 and 104T3, and the hierarchical block 105 includes one area terminal 105T. Each area terminal synchronizes a clock delay to each of the hierarchical blocks 102, 103, 104 and 105- and an equal-Length path is estimated in consideration of a clock arrival time from a clock input terminal 100 of the semiconductor chip to each of the area terminals 102T1 to 105T and a wiring 101 of a clock line is connected by using the upper layer of a wiring layer over a hierarchical top.

According to the first embodiment, thus, a plurality of special area terminals for a clock input which serves as the source points for adjusting a clock delay is provided in each hierarchical block. Consequently, it is possible to easily realize the synchronizing conditions of the clock delay in the hierarchical block. It is possible to adjust the clock delay of the semiconductor integrated circuit device by distributing the wiring of the clock line through an equal-length wiring with the use of the upper layer of the wiring layer over the hierarchical top.

When estimating the equal-length path in consideration of the clock arrival time from the clock terminal 101 to each of the area terminals 102T1 to 105T and forming the wiring 101 of the clock line, it is possible to carry out a wiring design without the limitation of a layout by using the upper layer.

Thus, it is possible to synchronize the values of the clock delay of all the source points.

While the wiring 101 of the clock line is formed by the upper layer in the embodiment, it does not need to be always formed by the upper layer but adjustment can properly be carried out.

Second Embodiment

Next, a second embodiment of the invention will be described.

In the embodiment, in the case in which a clock delay between hierarchical blocks in a semiconductor integrated circuit device has a variation, a circuit design is carried out in the following procedure by a method of adjusting the clock delay over a hierarchical top.

1. The methods 1 and 2 according to the first embodiment of the invention.

2. There is used a method of clock distributing and connecting the wiring of a clock line between the clock input terminal of a semiconductor chip and each special area terminal for a clock input over a hierarchical top with the use of the upper layer of a wiring layer in such a wiring length as to consider a variation in the clock delay up to the special area terminals for a clock input in each hierarchical block.

According to the method, even if the clock delay up to the special area terminal for a clock input in each hierarchical block has a variation, it is possible to adjust the clock delay by regulating the wiring length depending on the variation to distribute the wiring of a clock line between the clock input terminal of the semiconductor chip and each special area terminal for a clock input over the hierarchical top.

The second embodiment of the invention will be described below with reference to the drawings.

Figure 2:
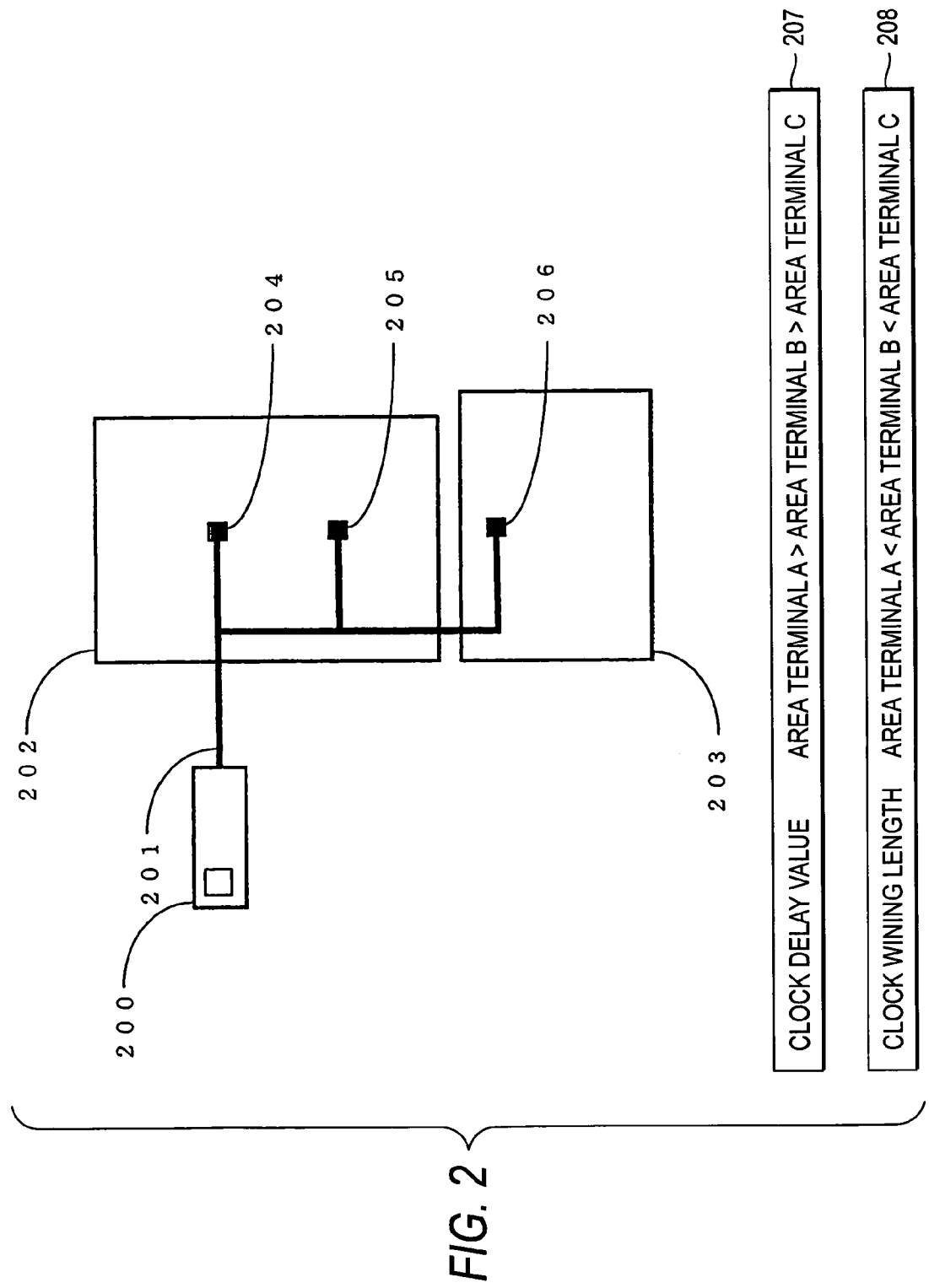
FIG. 2 is a diagram showing a method of adjusting a clock delay over a hierarchical top by such a clock distribution wiring as to take a variation in the clock delay into consideration according to a second embodiment of the invention.

FIG. 2 shows a method of adjusting a clock delay between hierarchical blocks through such a clock distribution wiring as to take a variation in the clock delay into consideration according to the second embodiment of the invention. In FIG. 2, a hierarchical block 202 and a hierarchical block 203 are provided with a special area terminal A204 for a clock input and a special area terminal B205 for a clock input, and a special area terminal C206 for a clock input which serve as source points for adjusting a clock delay, respectively. In this case, a condition 207 of the value of a clock delay up to the area terminals 204, 205 and 206 in the hierarchical blocks 202 and 203 is set in order of "the area terminal A> the area terminal B> the area terminal C".

A clock distribution wiring connection is carried out in order of "the area terminal A< the area terminal B< the area terminal C" on a condition 208 for such a clock wiring length as to consider the wiring length of a wiring 201 of a clock line from a clock input terminal 200 of a semiconductor chip to the area terminals 204, 205 and 206 over a hierarchical top in order to maintain the relationship of the condition 207 in FIG. 2.

According to the second embodiment, thus, a plurality of special area terminals for a clock input which serves as the source points for adjusting the clock delay is provided in each hierarchical block, and the wiring of a clock line is distributed in such a wiring length as to take a slight variation in a clock delay into consideration by practically utilizing the upper layer of a wiring layer over the hierarchical top even if the variation in the clock delay is caused on each point. Consequently, it is possible to carry out the adjustment of the clock delay in the semiconductor integrated circuit device.

Third Embodiment

Next, a third embodiment of the invention will be described.

In the embodiment, a clock wiring from the clock input terminal of a semiconductor chip to an area terminal for a clock input on each hierarchical block and a clock distribution of a clock input circuit such as each flip-flop from each area terminal are carried out, and the clock input terminal and each area terminal are wired over a hierarchical top in such a manner that a total clock wiring length is almost the smallest or a maximum clock wiring length is almost the smallest, for example, and a difference in a delay value between each area terminal and the clock input terminal is calculated and a clock delay from each area terminal to a plurality of clock input circuits is adjusted in order to compensate for the difference in the delay value in each hierarchical block. For example, a close area terminal to the clock input terminal can obtain a great clock delay value by carrying out a clock distribution over a large number of clock input circuits in the hierarchical block. Moreover, a distant area terminal from the clock input terminal can obtain a small clock delay value by carrying out the clock distribution over a small number of clock input circuits in the hierarchical block. Thus, there is equalized a clock delay value acquired by summing the clock delay value obtained by the clock wiring over the hierarchical top and the clock delay value obtained by the clock distribution in the hierarchical block. For an effective method, similarly, the total clock delay is adjusted by regulating the clock wiring length over the hierarchical top when it is hard to adjust the clock delay within the hierarchical block.

The third embodiment of the invention will be described below with reference to the drawings.

Figure 3:
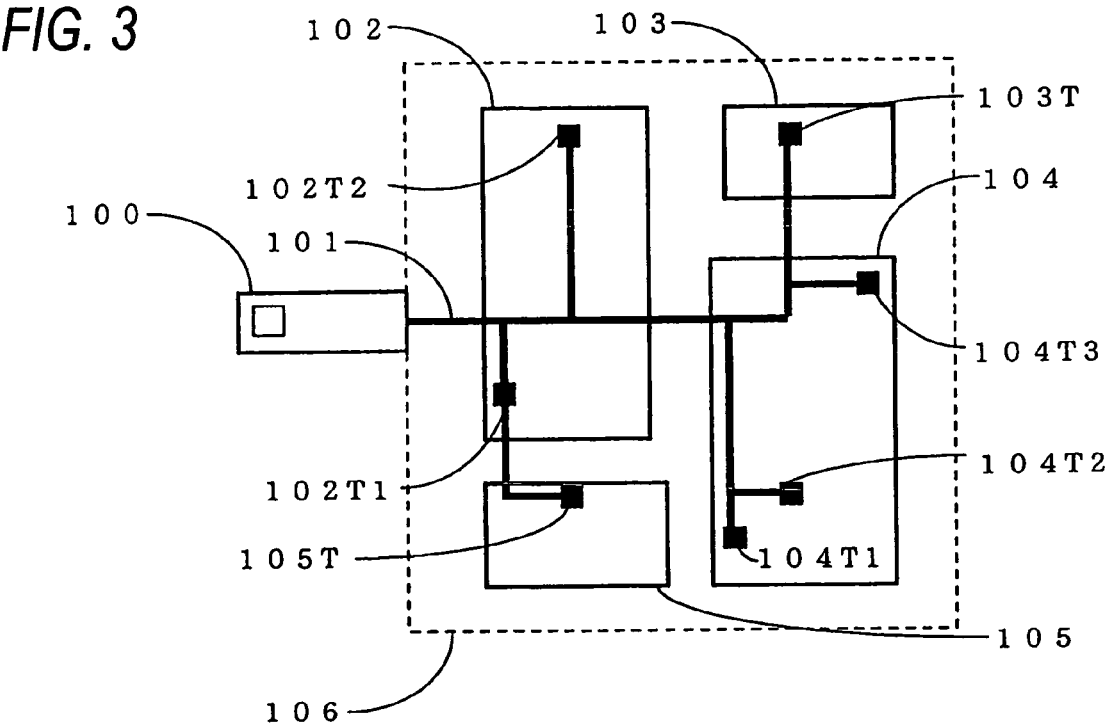
FIG. 3 is a diagram showing a method of adjusting a clock delay over a hierarchical top by a clock distribution wiring according to a third embodiment of the invention.

FIG. 3 shows a method of adjusting the clock delay of a hierarchical block which does not use a clock distribution wiring to be an equal-length wiring according to the third embodiment of the invention. In FIG. 3, the same functions as those in FIG. 1 have the same reference numerals. In FIG. 3, a clock wiring is carried out in such a manner that a total clock wiring length between a clock input terminal and area terminals 102T1, 102T2, 103T, 104T1, 104T2, 104T3 and 105T is set to be almost the smallest over a hierarchical top. For another method, the clock wiring can also be carried out in such a manner that a maximum clock wiring length is set to be almost the smallest. By utilizing a wiring at 45 degrees or an optional angle, moreover, it is possible to further reduce a wiring length and a clock delay value. Consequently, the clock delay value from the clock input terminal to each area terminal is varied. In consideration of a resistance value and a capacity value of the clock wiring, and further more, a capacity value to be added to the area terminal, a difference in the delay value from the clock input terminal to each area terminal is calculated by a simulation. In order to compensate for the difference in the delay value, the clock distribution is carried out by using a method such as CTS from the respective area terminals to each clock input circuit or a method of adjusting the number of clock input circuits to be clock distributed from each area terminal.

Fourth Embodiment

A fourth embodiment of the invention is characterized in that there is used a method of carrying out any of the first to third embodiments for each method clock system for adjusting a clock delay between hierarchical blocks in the case in which a plurality of clock systems in a semiconductor integrated circuit device is present.

According to the method, also in the case in which a plurality of clock systems is present, the clock delay between the hierarchical blocks can be adjusted.

The fourth embodiment of the invention will be described below with reference to the drawings.

Figure 4:
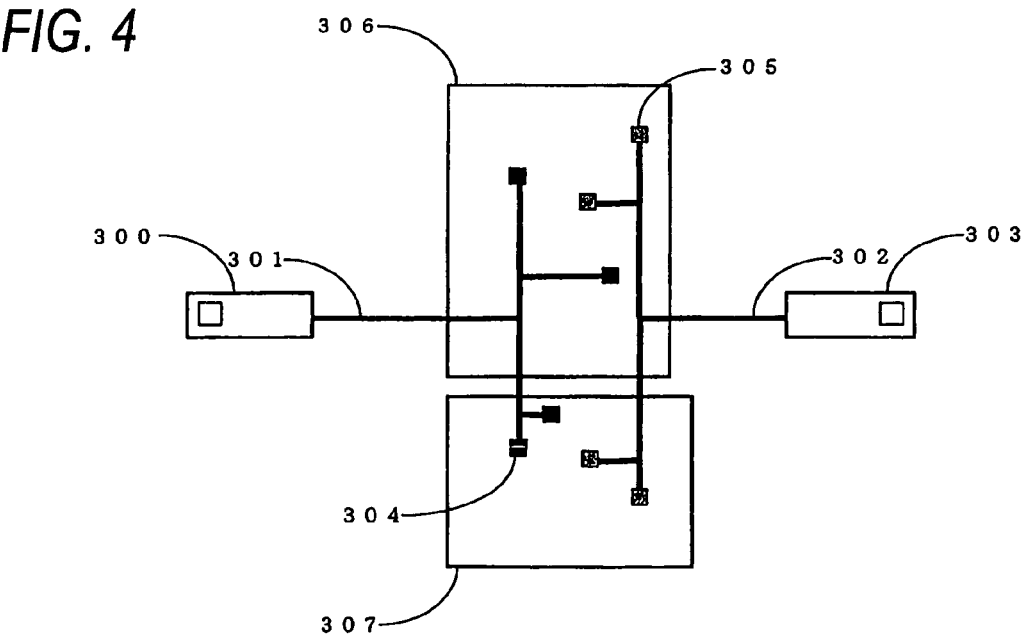
FIG. 4 is a diagram showing a method of adjusting a clock delay over a hierarchical top in a multisystem clock according to a fourth embodiment of the invention.

FIG. 4 shows a method of adjusting a clock delay between hierarchical blocks in a multisystem clock according to the fourth embodiment of the invention. In FIG. 4, an area terminal 304 belonging to a clock line A and an area terminal 305 belonging to a clock line B are provided for each clock system as source points for adjusting a clock delay in a hierarchical block A306 and a hierarchical block B307. By utilizing the upper layer of a wiring layer over a hierarchical top, clock input terminals A300 to 304 of a semiconductor chip are connected through a wiring 301 of the clock line A for each clock system with the execution of the first or second embodiment of the invention. Similarly, clock input terminals B303 to 305 of the semiconductor chip are connected through a wiring 302 of the clock line B with the execution of any of the first to third embodiments of the invention.

According to the fourth embodiment, thus, a plurality of area terminals is provided in each hierarchical block and a clock is supplied from a plurality of clock lines to each area terminal by utilizing any of the first to third embodiments of the invention also when the clock delays of a plurality of clock systems are to be adjusted between the hierarchical blocks. Consequently, the clock delay of the semiconductor integrated circuit device can be adjusted.

Fifth Embodiment

In a fifth embodiment of the invention, a repeater buffer circuit is inserted in a hierarchical block or on a hierarchical top over the wiring of a clock line as a method of taking a countermeasure against the waveform rounding of a clock over the wiring of the clock line of the hierarchical top in the execution of any of the first to fourth embodiments of the invention.

According to the method, the repeater buffer circuit is optionally provided on the wiring of the clock line. Also in the execution of any of the first to fourth embodiments of the invention, consequently, a countermeasure can be taken against the waveform rounding of a clock.

The fifth embodiment of the invention will be described below with reference to the drawings.

Figure 5:
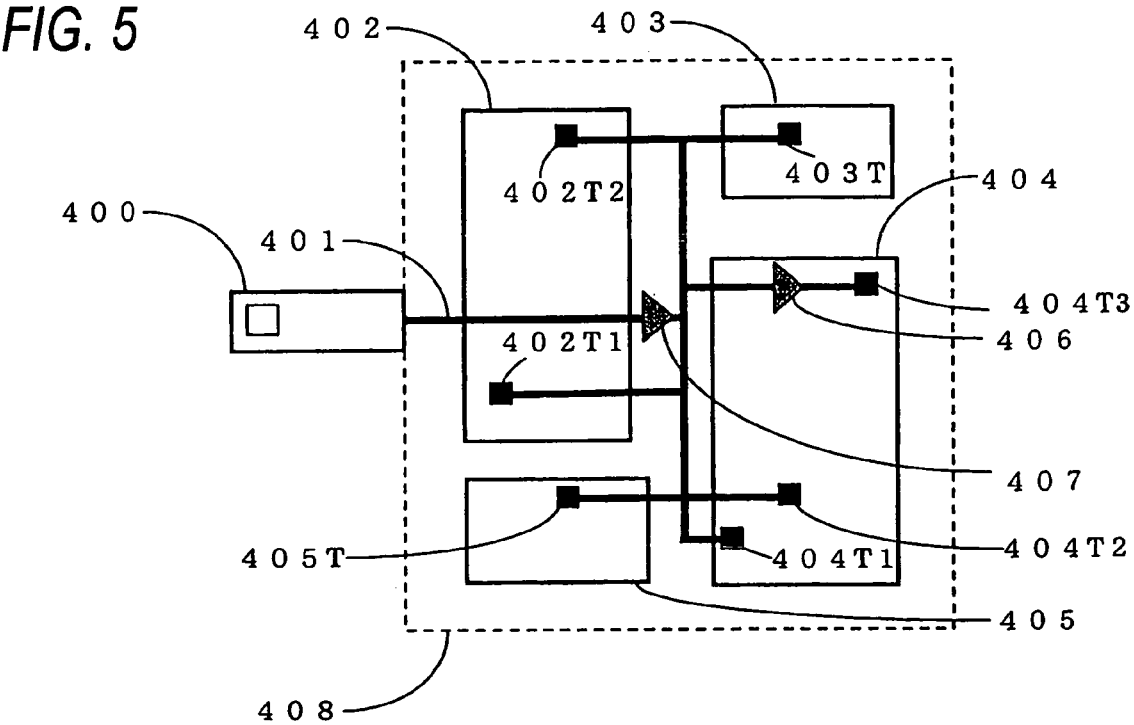
FIG. 5 is a diagram showing a method of taking a countermeasure against waveform rounding in a clock line over a hierarchical top according to a fifth embodiment of the invention.

FIG. 5 shows a method of taking a countermeasure against waveform rounding in a clock line between hierarchical blocks according to the fifth embodiment of the invention. In FIG. 5, a place in which the waveform rounding is apt to be generated is predicted from a floor plan in a wiring 401 path of a clock line between a special area terminal 409 for a clock input of a hierarchical block A402, a hierarchical block B, a hierarchical block C404 and a hierarchical block D405 in a boundary 408 of a semiconductor chip and a clock input terminal 400 of the semiconductor chip, respectively. The repeater buffer circuit is inserted in the place in which the waveform rounding is apt to be generated depending on a situation based on the floor plan.

A repeater buffer circuit 406 of the clock line in the hierarchical block or a repeater buffer circuit 407 of the clock line between the hierarchical blocks is inserted in the predicted place to carry out a wiring connection.

According to the fifth embodiment, thus, it is possible to adjust the clock delay of a semiconductor integrated circuit device while taking a countermeasure against waveform rounding over the wiring of the clock line of the hierarchical top also in the first to fourth embodiments of the invention.

Sixth Embodiment

In a sixth embodiment of the invention, a circuit design is carried out in the following procedure by a method of adjusting a clock delay in the case in which a clock control circuit is inserted on a clock line up to a flip-flop circuit in a hierarchical block.

First of all, 1. a special area terminal for a clock input is provided before the input of the clock control circuit on the clock line in the hierarchical block. Then, 2. the clock delay of each flip-flop circuit is adjusted by using a delay adjusting buffer circuit for the clock line after a gate circuit for clock control. Thereafter, 3. a connection having the distribution of the wiring of the clock line according to the first to third embodiments of the invention is carried out over a hierarchical top.

According to the method, even if the gate circuit for the clock control is present on the clock line in the hierarchical block, the adjustment of the clock delay according to the first to fourth embodiments of the invention can be carried out over the hierarchical top.

The sixth embodiment of the invention will be described below with reference to the drawings.

Figure 6:
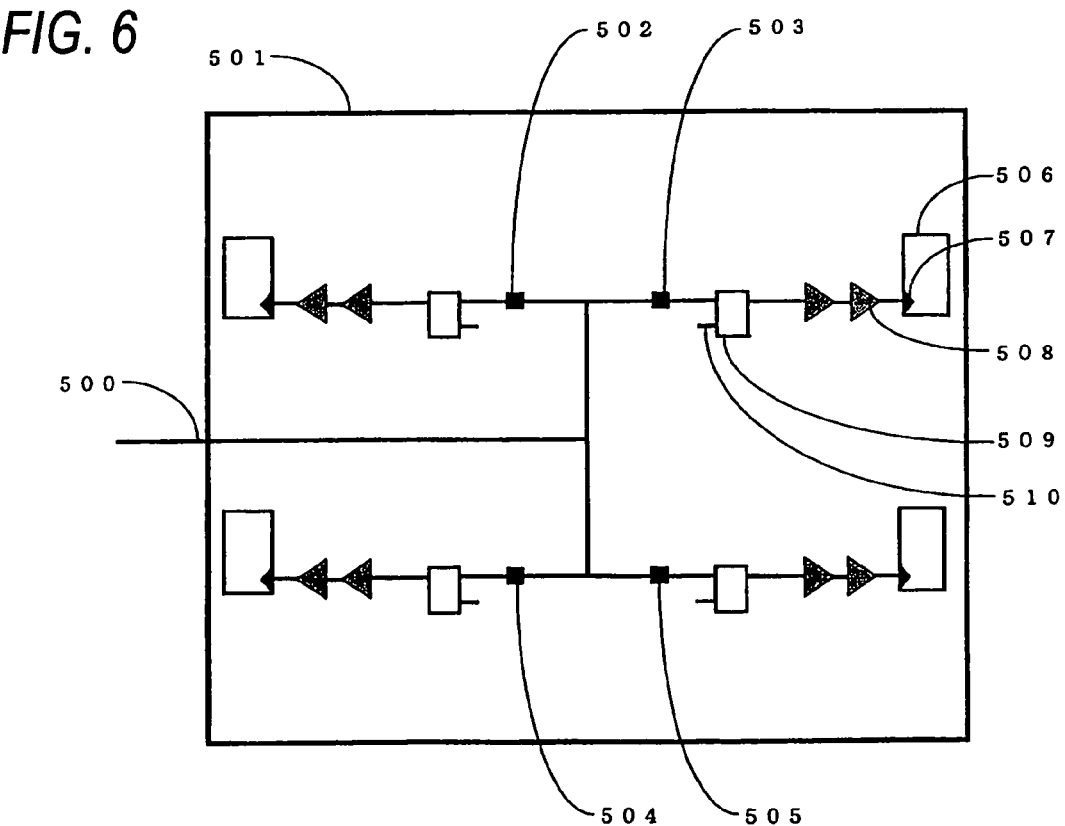
FIG. 6 is a diagram showing a method of adjusting a clock delay in the case in which a gate circuit is provided on a clock line in a hierarchical block according to a sixth embodiment of the invention.

FIG. 6 shows a method of adjusting a clock delay in the case in which a gate circuit is provided on a clock line in a hierarchical block according to the sixth embodiment of the invention. In FIG. 6, a special area terminal A502 for a clock input, a special area terminal B503 for a clock input, a special area terminal C504 for a clock input and a special area terminal D505 for a clock input are provided on a wiring 500 of a clock line before the input of a gate circuit 509 for clock control to which a control terminal 510 to be used for stopping a clock signal in a hierarchical block 501 is attached, respectively. A clock delay from the area terminals 502, 503, 504 and 505 to a clock terminal 507 of a flip-flop circuit for a flip-flop circuit 506 interposing the gate circuit 509 therebetween is adjusted by the insertion of a delay adjusting buffer circuit 508 of a clock line between the gate circuit 509 and the flip-flop circuit 506. Then, the wiring connection of the clock line 500 is carried out over the hierarchical top according to the execution of the first, second and third embodiments of the invention.

According to the sixth embodiment, thus, even if the gate circuit for the clock control is present on the clock line in the hierarchical block, the special area terminal for a clock input is provided before the input of the gate circuit and the clock delay in the hierarchical block is adjusted by using the delay adjusting buffer circuit of the clock line between the gate circuit and the flip-flop circuit. By carrying out the adjustment over the hierarchical top according to the first to fourth embodiments of the invention, moreover, it is possible to adjust the clock delay of a semiconductor integrated circuit device.

Seventh Embodiment

In a seventh embodiment of the invention, a circuit design is carried out in the following procedure by a method of reusing a wiring path for a clock line over a hierarchical top before a floor plan correction such as a change in the direction of rotation of a hierarchical block, a change in a size and a change in an arrangement position when the correction is caused.

When a source point for adjusting a clock delay is to be determined in the hierarchical block in which the floor plan correction is to be caused, it is defined in a position in which a special area terminal for a clock input can be connected to the wiring path for the clock line before the floor plan correction and the floor plan is thus corrected.

According to the method, the special area terminal for a clock input is provided in the position in which the connection to the wiring path for the clock line obtained before the floor plan correction can also be carried out after the floor plan correction of the hierarchical block. Therefore, the wiring path for the clock line can be reused.

The seventh embodiment of the invention will be described below with reference to the drawings.

Figure 7:
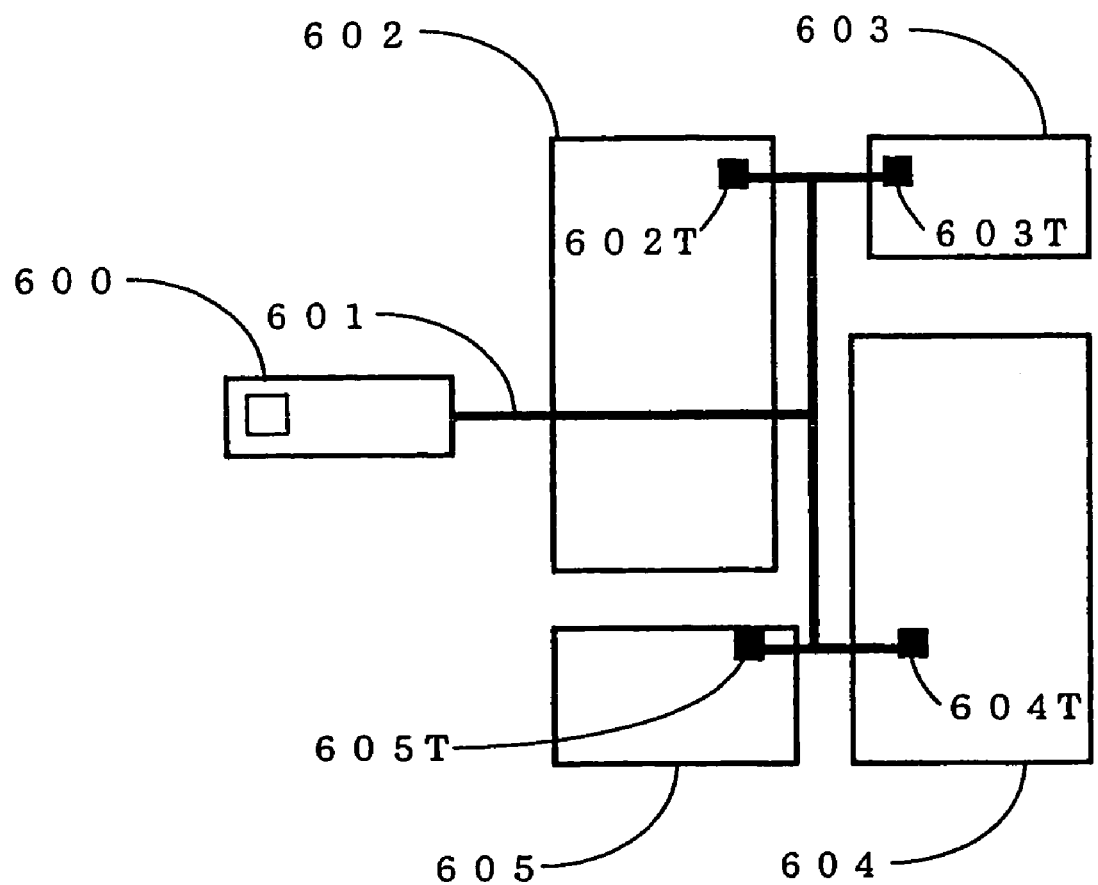
FIG. 7 is a diagram showing an example in which an H-type wiring is carried out through a clock distribution over a hierarchical top according to a seventh embodiment of the invention.
Figure 8:
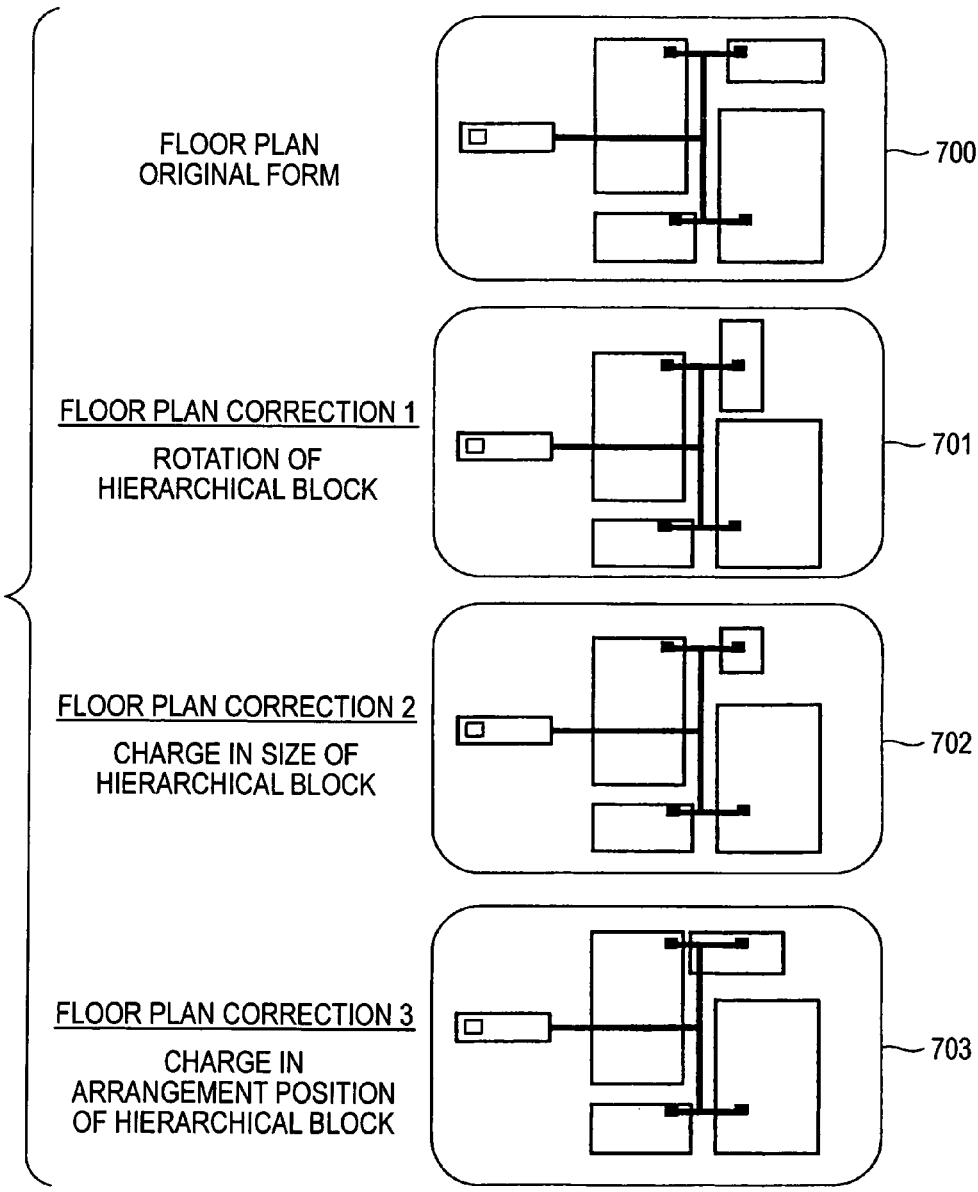
FIG. 8 is a diagram showing a method corresponding to a floor plan correction using an H-type clock distribution wiring path over the hierarchical top according to the seventh embodiment of the invention.

FIG. 7 shows an example in which an H-type wiring is carried out through a clock distribution between hierarchical blocks according to the seventh embodiment of the invention. Moreover, FIG. 8 shows a method corresponding to a floor plan correction using an H-type clock distribution wiring path between the hierarchical blocks according to the seventh embodiment of the invention. In FIG. 7, a clock distribution and a connection are carried out from respective special area terminals for a clock input on a hierarchical block A602, a hierarchical block B603, a hierarchical block C604 and a hierarchical block D605 to a clock input terminal 600 of a semiconductor chip through an H-type wiring 601 of a clock line.

In this state, an original form 700 of a floor plan which is obtained before a floor plan correction is defined in FIG. 8.

It is apparent that the 601 path before the floor plan correction can be still utilized even if a floor plan correction 701 based on a change in a direction by the rotation of the hierarchical block, a floor plan correction 702 based on a change in the size of the hierarchical block and a floor plan correction 703 based on a change in the position of arrangement of the hierarchical block are carried out in the floor plan correction in a position in which the special area terminal for a clock input of the hierarchical block after the correction can be connected to the 601 path of the original form 700 obtained before the floor plan correction.

According to the seventh embodiment, thus, even if the floor plan correction of the hierarchical block is caused, it is possible to exactly utilize a wiring path obtained before the correction by determining a source point for adjusting a clock delay in the hierarchical block for carrying out the floor plan correction in a position in which the special area terminal for a clock input can be connected to a wiring path for a clock line obtained before the floor plan correction.

While the special area terminal for a clock input is used in the embodiment, it does not need to be exclusive but it can also be used as a test terminal and is desirably provided in a place in which a wiring connection is not restricted.

Although it is desirable that the clock line should be formed on an upper layer as a special wiring layer because of a high degree of freedom, moreover, the layer to be formed is not restricted to the upper layer but may be formed in a layer in which another wiring layer is provided.

Eighth Embodiment

In an eighth embodiment of the invention, in the case in which the adjustment of a clock delay between the hierarchical blocks of one chip through an equal-length wiring is carried out from the clock input terminal of a semiconductor chip to a special area terminal for a clock input of each hierarchical block and a place in which a clock delay value does not satisfy a synchronous desired value is generated over a clock line from the special area terminal for a clock input in a certain hierarchical block to the clock terminal of each flip-flop circuit, a delay adjusting buffer circuit is inserted again in the place over the clock line to be an object by a clock tree synthesis (CTS) method to adjust the clock delay.

According to the method, the adjustment of the clock delay between the hierarchical blocks of one chip is carried out and the delay adjusting buffer circuit is then inserted again by the clock tree synthesis (CTS) method for a hierarchical block in which the synchronization of the clock delay is not taken, thereby adjusting the clock delay. Consequently, it is possible to synchronize the clock delay between the hierarchical blocks of one chip.

The eighth embodiment of the invention will be described below with reference to the drawings.

Figure 9:
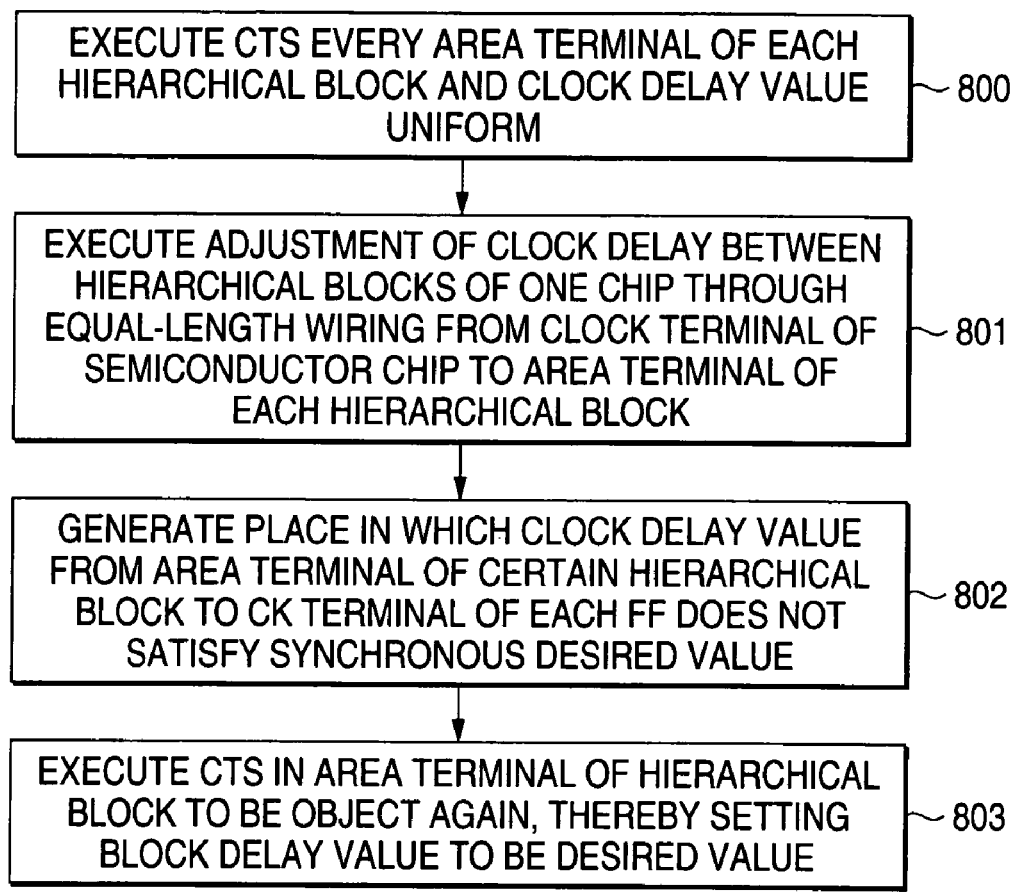
FIG. 9 is a diagram showing a method of carrying out the adjustment of a clock delay over a hierarchical block again, thereby adjusting the clock delay of one chip according to an eighth embodiment of the invention.
Figure 10:
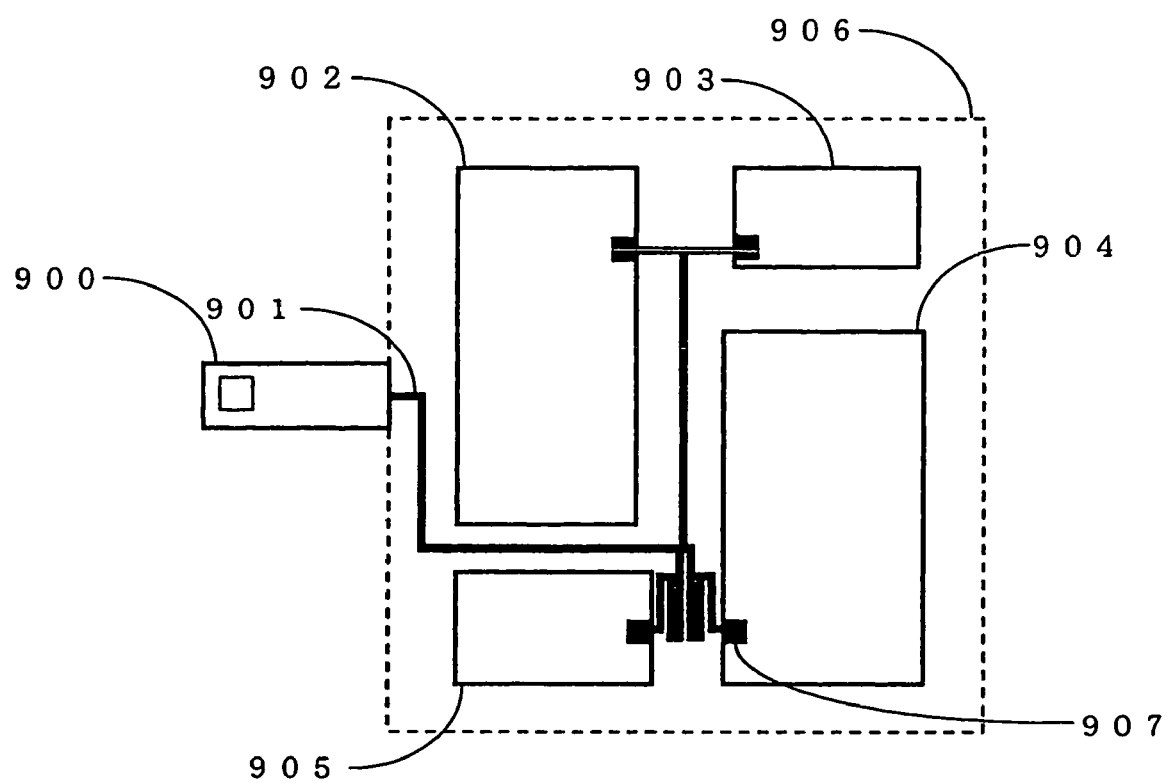
FIG. 10 is a diagram showing a method of adjusting a clock delay over a hierarchical top through a clock distribution wiring to be an equal-length wiring according to the conventional art.

FIG. 9 shows a method of carrying out the adjustment of a clock delay over a hierarchical block again, thereby adjusting the clock delay of one chip according to the eighth embodiment of the invention. In FIG. 9, in the case in which a step 802 of generating a place in which the synchronization of a clock delay value is shifted in a certain hierarchical block is produced through a step 800 of adjusting the clock delay of a hierarchical block and a step 801 of adjusting the clock delay between the hierarchical blocks of one chip, a countermeasure is taken against the problem in that the synchronization of the clock delay value in the step 802 is shifted at a step 803 of adjusting the clock delay of the hierarchical block again.

According to the eighth embodiment, thus, even if there is a hierarchical block in which the synchronization of a clock delay is not taken after the adjustment of the clock delay between the hierarchical blocks of one chip is carried out, the delay adjusting buffer circuit is inserted again in a hierarchical block to be an object by the clock tree synthesis (CTS) method to carry out a clock delay, thereby synchronizing the clock delay between the hierarchical blocks of one chip. Consequently, it is possible to carry out the adjustment of the clock delay of a semiconductor integrated circuit device.

The invention can be applied to the design of various semiconductor integrated circuits, and particularly, is effective for such a circuit as to be a problem of a clock delay. A fine source point for adjusting the clock delay is investigated depending on the circuit design conditions of each hierarchical block, and a position is freely determined on the point over the hierarchical block and a plurality of area terminals for a clock input is provided if necessary. Consequently, it is possible to easily implement the synchronization of the clock delay from the area terminals in the hierarchical block to a clock input circuit.

What is claimed is:

1. A clock delay adjusting method of a semiconductor chip including hierarchical blocks, each hierarchical block including at least one clock input circuit which synchronously operates with a clock, wherein a plurality of source points for adjusting a clock delay is provided in order to synchronize a value of the clock delay from each of the source points of each of the hierarchical blocks to clock input circuits, respectively, in accordance with circuit design conditions of the hierarchical blocks, and area terminals are provided in the source points, respectively, and a clock input terminal of the semiconductor chip and each area terminal are connected through a clock line so as to be clock distributed over a hierarchical top, a clock delay between the hierarchical blocks is adjusted, and at least one of the hierarchical blocks has a plurality of area terminals, and wiring length to the clock input terminal from one of the plurality of area terminals is equal to that from another area terminal.

2. The clock delay adjusting method according to claim 1, wherein the area terminals are special input terminals for clock input.

3. The clock delay adjusting method of a semiconductor integrated circuit device according to any of claims 1 to 2, wherein the clock input terminal of the semiconductor chip and the area terminal are connected through a clock distribution to obtain such a wiring length as to compensate for a variation in the clock delay value of the source point in the hierarchical block.

4. The clock delay adjusting method of a semiconductor integrated circuit device according to any of claims 1 to 2, wherein when a clock delay between the hierarchical blocks of one chip through an equal-length wiring is adjusted from the clock input terminal of the semiconductor chip to the special area terminal for a clock input of the hierarchical block and a place in which the clock delay value does not satisfy a synchronous desired value is then generated over the clock line from the special area terminal for a clock input in a certain hierarchical block to the clock input circuit, a delay adjusting buffer circuit is inserted in a place on the clock line to be an object again, thereby adjusting the clock delay and synchronizing the clock delay between the hierarchical blocks of one chip.

5. A clock delay adjusting method of a semiconductor chip including hierarchical blocks, each hierarchical block including one or more clock input circuits which synchronously operates with a clock,
   wherein an area terminal for a clock input is provided to each hierarchical block in accordance with a clock wiring design of the semiconductor chip,
   a clock input terminal of the semiconductor chip and each area terminal are wired over a hierarchical top,
   a difference between a delay value from an area terminal to the clock input terminal and a value from another area terminal to the clock input terminal is calculated, and
   a clock delay from the area terminal to each clock input circuit is adjusted based on wiring length from the clock input terminal to each area terminal in order to compensate for the difference in the delay value in the hierarchical block.

6. The clock delay adjusting method according to claim 5, wherein the clock input terminal of the semiconductor chip and the area terminal for a clock input are wired over the hierarchical top in such a manner that a total clock wiring length is almost the smallest.

7. The clock delay adjusting method according to claim 5, wherein the clock input terminal of the semiconductor chip and the area terminal for a clock input are wired over the hierarchical top in such a manner that a maximum clock wiring length is almost the smallest.

8. The clock delay adjusting method according to any of claims 5 to 7, wherein a number of the clock input circuits for a clock distribution in the hierarchical block is increased from the clock input terminal of the hierarchical top to an area terminal having a small clock delay value, and the number of the clock input circuits for a clock distribution in the hierarchical block is reduced from the clock input terminal to an area terminal having a great clock delay value, thereby adjusting a clock delay.

9. The clock delay adjusting method according to any of claims 1 or 5, wherein the clock line is formed by using a special wiring layer.

10. The clock delay adjusting method of a semiconductor integrated circuit device according to any of claims 1 or 5, wherein the clock input terminal is constituted by a plurality of clock input terminals, and forms a multisystem clock having such a structure that a clock input is carried out from the clock input terminals to one hierarchical block.

11. The clock delay adjusting method of a semiconductor integrated circuit device according to any of claims 1 or 5, wherein a repeater buffer circuit is further inserted in or between the hierarchical blocks on a wiring of the clock line over the hierarchical top, thereby suppressing waveform rounding of a clock signal.

12. The clock delay adjusting method of a semiconductor integrated circuit device according to any of claims 1 or 5, wherein a plurality of clock input circuits is provided in the hierarchical block, and
   the value of the clock delay of the clock line between a clock control circuit in the hierarchical block and each of the clock input circuits is adjusted by using a delay adjusting buffer circuit when the clock control circuit is to be inserted into the clock line to each of the clock input circuits.

13. The clock delay adjusting method of a semiconductor integrated circuit device according to any of claims 1 or 5, wherein a position of arrangement of the area terminal is adjusted in such a manner that a wiring path for the clock line obtained before a floor plan correction can also be reused after the floor plan correction.

14. A semiconductor integrated circuit device using the clock delay adjusting method of a semiconductor integrated circuit device according to any of claims 1 or 5.

15. The semiconductor integrated circuit device according to claim 14, wherein at least one of the hierarchical blocks includes a plurality of special area terminals for a clock input, and a clock line is constituted by a special wiring layer for the clock line which is provided as an upper layer on the area terminal.

* * * * *